United States Patent [19]
Hiterer

[11] Patent Number: 5,903,069
[45] Date of Patent: May 11, 1999

[54] SYNCHRONOUS RECIPROCATING ELECTRIC MACHINES

[75] Inventor: Misha Hiterer, Jeruslaem, Israel

[73] Assignee: Medis El, Ltd., Israel

[21] Appl. No.: 08/933,856

[22] Filed: Sep. 19, 1997

[51] Int. Cl.⁶ .......................... H02K 33/16; H02K 33/00
[52] U.S. Cl. .............................. 310/15; 310/12; 310/162; 310/156; 310/36
[58] Field of Search ................................ 310/162, 12, 15, 310/13, 156, 36; 290/42, 53

[56] References Cited

U.S. PATENT DOCUMENTS

| | | | |
|---|---|---|---|
| 3,891,874 | 6/1975 | Roters et al. | 310/15 |
| 4,675,563 | 6/1987 | Goldowsky | 310/15 |
| 4,704,553 | 11/1987 | Resnicow | 310/12 |
| 4,945,269 | 7/1990 | Kamm | 310/15 |
| 4,985,652 | 1/1991 | Oudet et al. | 310/15 |
| 5,654,596 | 8/1997 | Nasar et al. | 310/12 |

*Primary Examiner*—Nestor Ramirez
*Assistant Examiner*—B. Mullins
*Attorney, Agent, or Firm*—R. Neil Sudol; Henry D. Coleman

[57] ABSTRACT

A synchronous reciprocating electric machine includes a first magnet system having first and second opposing surfaces forming between them a gap, and a second magnet system mounted within the gap so as to be displaceable relative to the first magnet system along a line of travel through the gap. The the first magnet system is configured for generating a magnetic field, referred to as the "gap field", directed across the gap primarily perpendicular to the first surface. The second magnet system includes two magnetic elements configured to generate equal but opposite magnetic fields primarily perpendicular to the first surface. These magnetic elements are spaced from each other along the line of travel by a distance b, where b>0. One of magnet systems produces a non-alternating magnetic field and the other is a coil assembly for producing an operating magnetic field. The machine also includes electrical connections connecting to the coil assembly so as to allow operation of the electric machine with reciprocation of the second magnet system relative to the first magnet system.

39 Claims, 11 Drawing Sheets

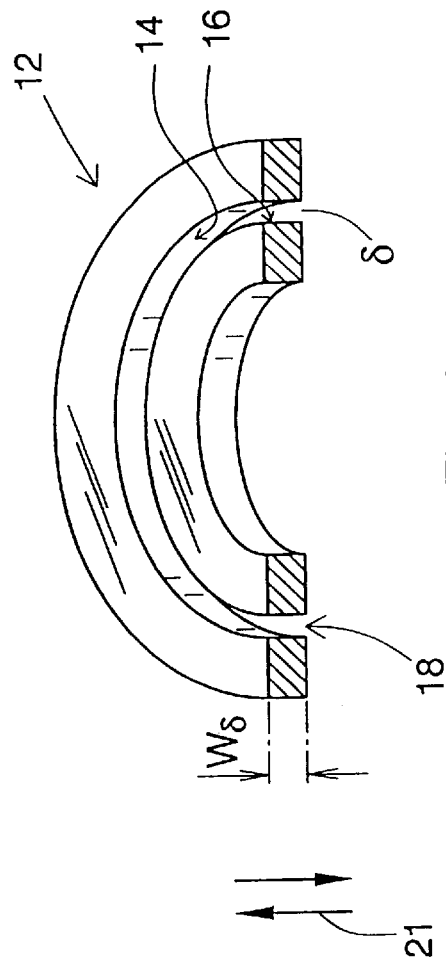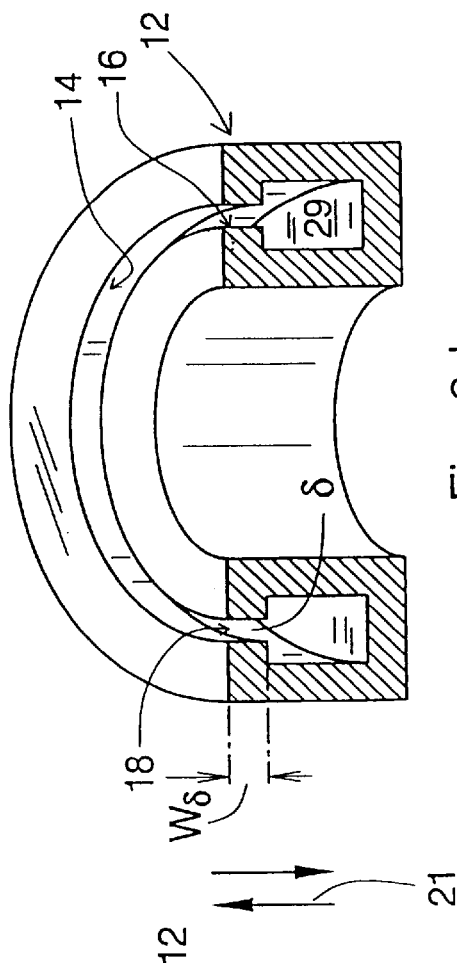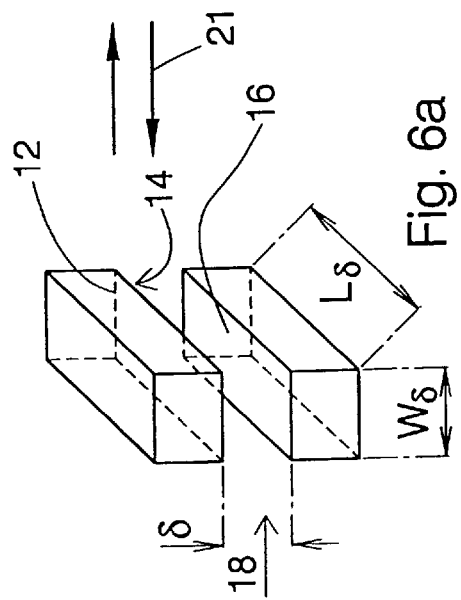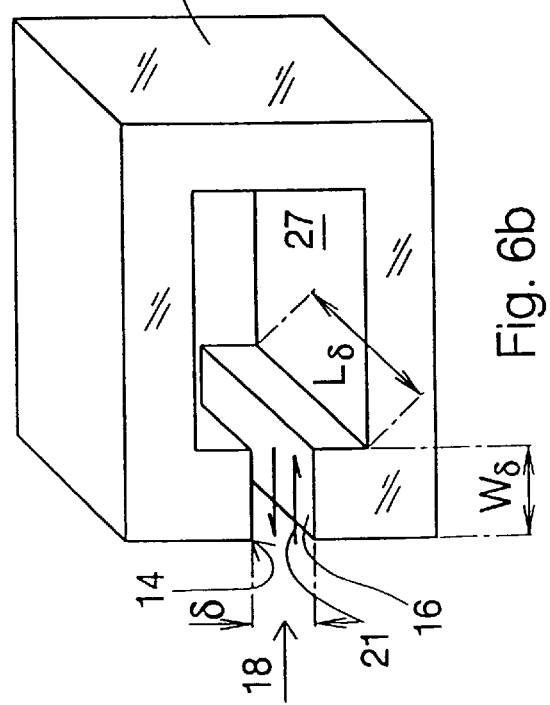

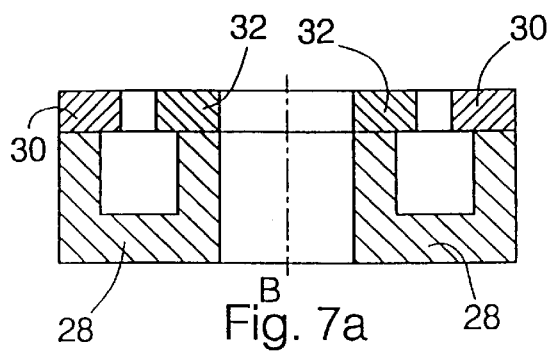
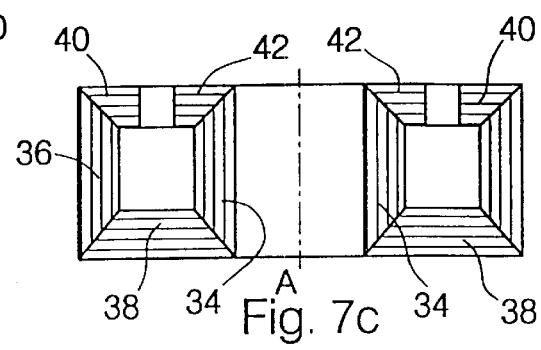
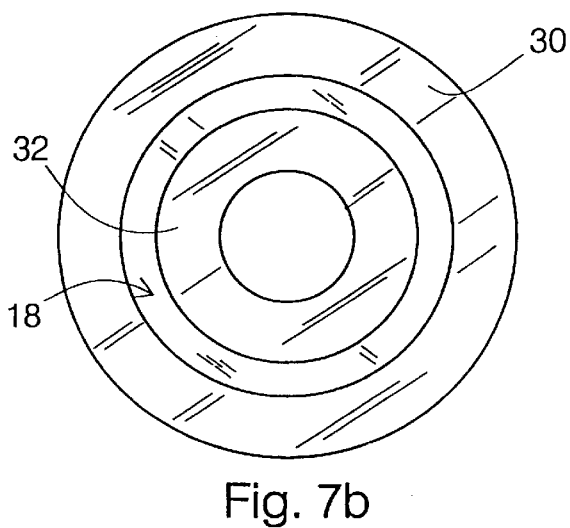
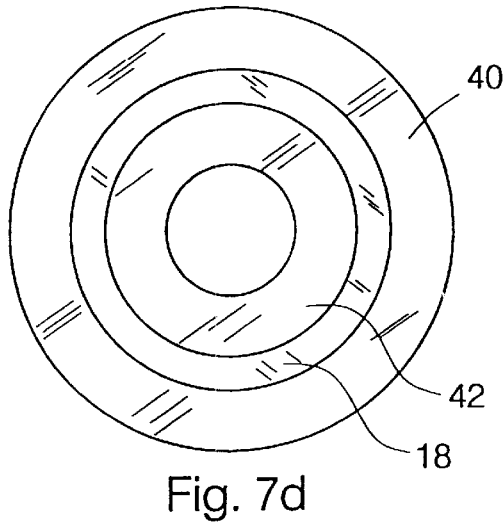
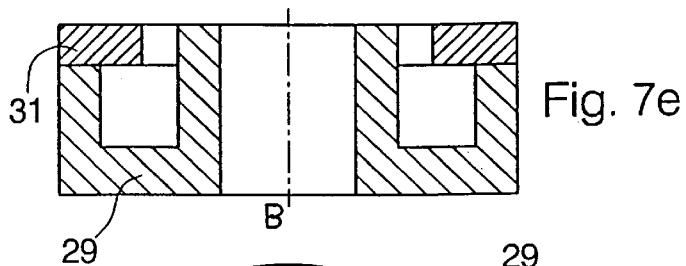
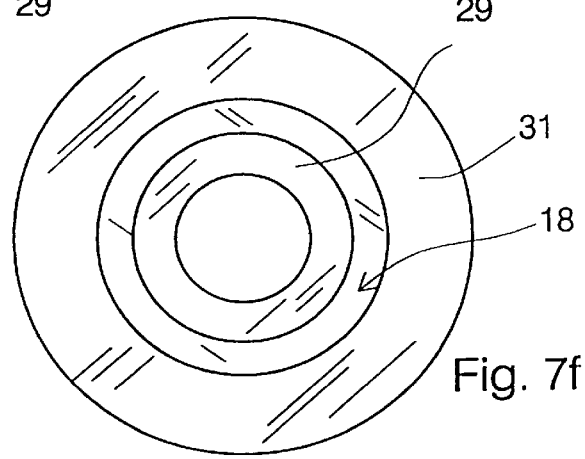
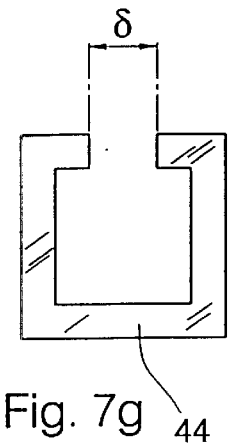

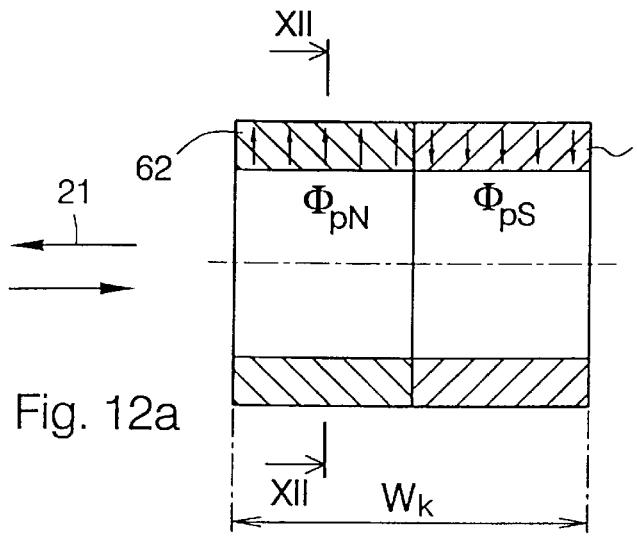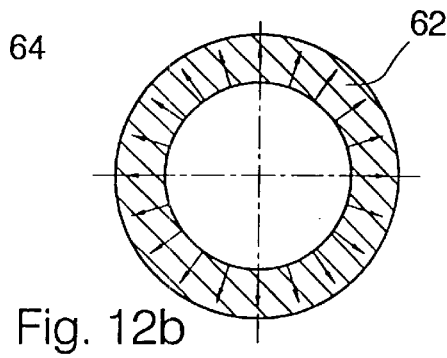
Fig. 12a  Fig. 12b
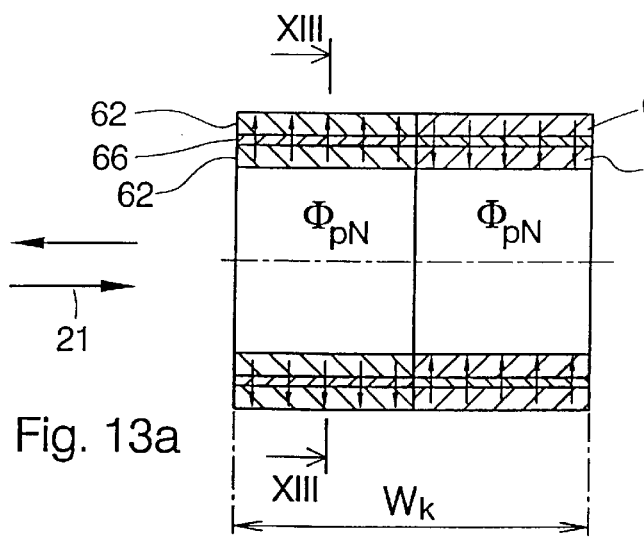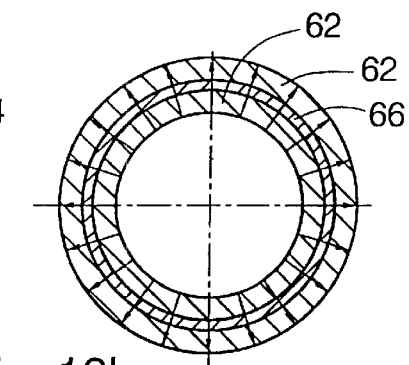
Fig. 13a  Fig. 13b
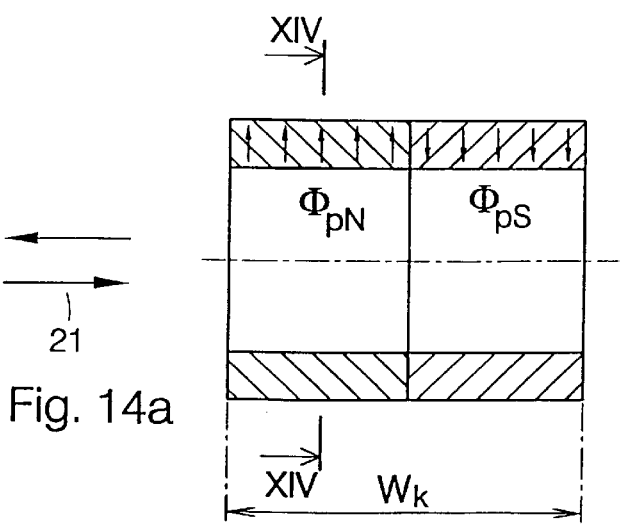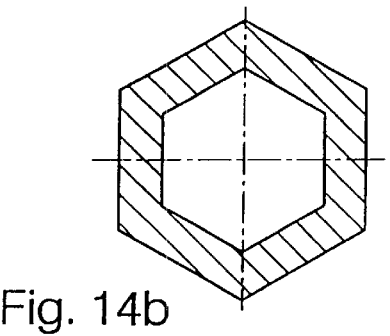
Fig. 14a  Fig. 14b

SYNCHRONOUS RECIPROCATING ELECTRIC MACHINES

FIELD AND BACKGROUND OF THE INVENTION

The present invention relates to electric machines and, in particular, it concerns synchronous reciprocating electric machines and methods for their design.

Alternating current electric machines excited by permanent magnets or field windings are known in the literature as synchronous machines (rotating or linear). A rotating or running field generated by the system of windings attracts the systems of field poles (excited by windings or permanent magnets).

The speed of the movable part of electric machine is equal to speed of the rotating (running) magnet field. That is why these machines are classified as synchronous. Their speed does not vary with either an applied load or a supplied voltage, being instead fully determined by an external circuit frequency and the pole number. For generators, an induced voltage frequency depends upon the speed and pole number while the voltage depends upon the design of the windings.

It should be noted that, while the theory and design methods of rotating synchronous electric machines are well developed in the literature worldwide, the theory, calculation methods and constructions of reciprocating machine are all but absent from the literature.

There is therefore a need for efficient compound-moving-magnet synchronous machines which make maximal use of the available magnetic flux, for linear or arcuate reciprocating movement. It would also be advantageous to provide a method of designing compound-moving-magnet synchronous machines which would optimize the design parameters for any given application.

SUMMARY OF THE INVENTION

The present invention is a compound-moving-magnet-system synchronous reciprocating electric machine with highly efficient use of magnetic flux and increased operational amplitude, and capable of arcuate reciprocating movement or of employing moving electromagnetic systems. The invention also relates to a method of designing compound-moving-magnet system synchronous machines which optimizes the design parameters for any given application.

The electric machines of the present invention may be used in all electric devices, instruments and tooling where reciprocating movement is required. The movement can be provided along a line of any shape. The shape of the movement is determined by suitable mounting of the movable part relative to the fixed one and corresponding construction design.

The present invention can be used to good effect for design of electric reciprocating generators driven by sea waves or wind, as well as for constructing electric actuators for replacing piston combustion motors.

A synchronous reciprocating electric machine comprises, in accordance with the present invention a first magnet system and a second magnet system. The first magnet system has a first surface and a second surface opposing the first surface so as to define there between a gap. The first magnet system is configured for generating a magnetic field directed across the gap primarily perpendicular to the first surface. The second magnet system is mounted within the gap so as to be displaceable relative to the first magnet system along a line of travel through the gap. The second magnet system includes a first magnetic element configured to generate a magnetic field primarily perpendicular to the first surface in a first direction and further includes a second magnetic element similar to, and mounted in fixed relation to, the first magnetic element. The second magnetic element is configured to generate a magnetic field primarily perpendicular to the first surface in a direction opposite to the first direction. One of the first and second magnet systems produces a non-alternating magnetic field, while the other of the first and second magnet systems is a coil assembly for producing an operating magnetic field. Electrical connections connect to the coil assembly so as to allow operation of the electric machine with reciprocation of the second magnet system relative to the first magnet system.

The magnet systems of the present invention are movable relative to one another. Generally, one magnet system is stationary, while the other moves to define the line or path of travel. Of course, it is possible for each magnet system to have a degree of motion relative to a fixed reference frame.

Pursuant to a feature of the present invention, the second magnetic element is spaced from the first magnetic element along the line of travel by a distance b, where b>0. Where the second magnet system includes a spacer of thickness b deployed between the first and second magnetic elements, the spacer may include soft magnetic material and/or non-magnetic material.

Where the second magnet system is distanced from the first surface of the first magnet system by a clearance gap of width $\Delta$, the second magnet system is preferably configured such that distance b has a magnitude not significantly less than width $\Delta$.

In one embodiment of the present invention, the second magnet system is mounted relative to the first magnet system by a mechanical coupling, while the mechanical coupling is configured to define a non-linear travel path.

The first magnet system may be formed as a substantially closed magnetic circuit. Also, the second magnet system may be implemented as the coil assembly.

In some embodiments of the present invention, the first and second surfaces of the first magnet system are shaped such that in a plane perpendicular to the line of travel the gap has a closed annular form. In such cases, the second magnet system is implemented as a corresponding hollow cylindrical magnet system.

Pursuant to a further feature of the present invention, the second magnet system includes a magnetically passive support structure for supporting the first and second magnetic elements. The support structure may be made from soft magnetic material and may be implemented as a substantially continuous layer, the first and second magnetic elements being attached to at least one surface of the layer.

The present invention is also directed to an associated method for designing a synchronous reciprocating electric machine of the above described type. The method comprises determining a maximum intended amplitude A of relative reciprocal movement, selecting a dimension $w_\delta$ for the first and second surfaces of the first magnet system as measured parallel to the line of travel such that the relation $w_\delta + b \geq 2A$ is applicable, and selecting a dimension $w_k$ for the second magnet system as measured parallel to the line of travel such that the relation $w_k \geq w_\delta + 2A$ holds. Preferably, b is greater than or equal to zero and is chosen to be at least about the spacing between the second magnet system and the first surface of the first magnet system. The second magnet system may be constructed with a magnetically-passive intermediate spacer of width b.

BRIEF DESCRIPTION OF THE DRAWINGS

FIGS. 6A–6D are schematic isometric views of a number of implementations of the first magnet system for use in the electric machine of FIG. 1;

FIG. 7A is a schematic cross-sectional view through a first construction for the magnet system of FIG. 6D;

FIG. 7B is a top view of the construction of FIG. 7A;

FIG. 7C is a schematic cross-sectional view through a second construction for the magnet system of FIG. 6D;

FIG. 7D is a top view of the construction of FIG. 7C;

FIG. 7E is a schematic cross-sectional view through a third construction for the magnet system of FIG. 6D;

FIG. 7F is a top view of the construction of FIG. 7E;

FIG. 7G is a schematic side view of a lamination layer for use in a fourth construction for the magnet system of FIG. 6D;

FIGS. 12A and 13A are schematic longitudinal cross-sectional views of two cylindrical implementations of the second magnet system of FIG. 1 employing permanent magnets;

FIGS. 12B and 13B are corresponding schematic transverse cross sectional views of the implementations of FIGS. 12A and 13A, taken along lines XII—XII and XIII—XIII, respectively;

FIG. 14A is a schematic longitudinal cross-sectional view of a hexagonal-section implementation of the second magnet system of FIG. 1 employing permanent magnets;

FIGS. 14B is a corresponding schematic transverse cross-sectional view of the implementation of FIG. 14A, taken along line XIV—XIV;

DESCRIPTION OF THE PREFERRED EMBODIMENTS

The present invention is a compound-moving-magnet-system synchronous reciprocating electric machine with highly efficient use of magnetic flux and increased operational amplitude, and capable of arcuate reciprocating movement or of employing moving electromagnetic systems. The invention also relates to a method of designing compound-moving-magnet synchronous machines which optimizes the design parameters for any given application.

The principles and operation of machines and methods according to the present invention may be better understood with reference to the drawings and the accompanying description.

Figure 1:
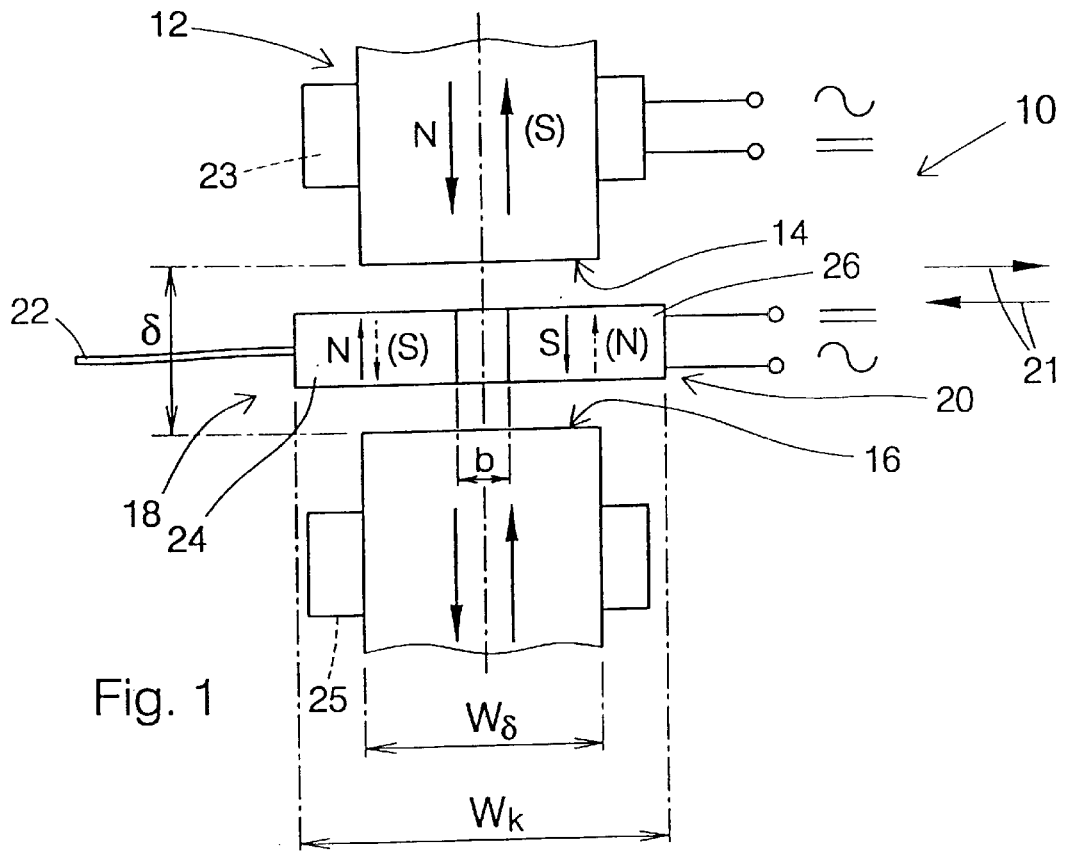
FIG. 1 is a schematic illustration of an electric machine, constructed and operative according to the present invention, having a linear or straight line of relative motion between a first magnet system and a second magnet system.
Figure 2:
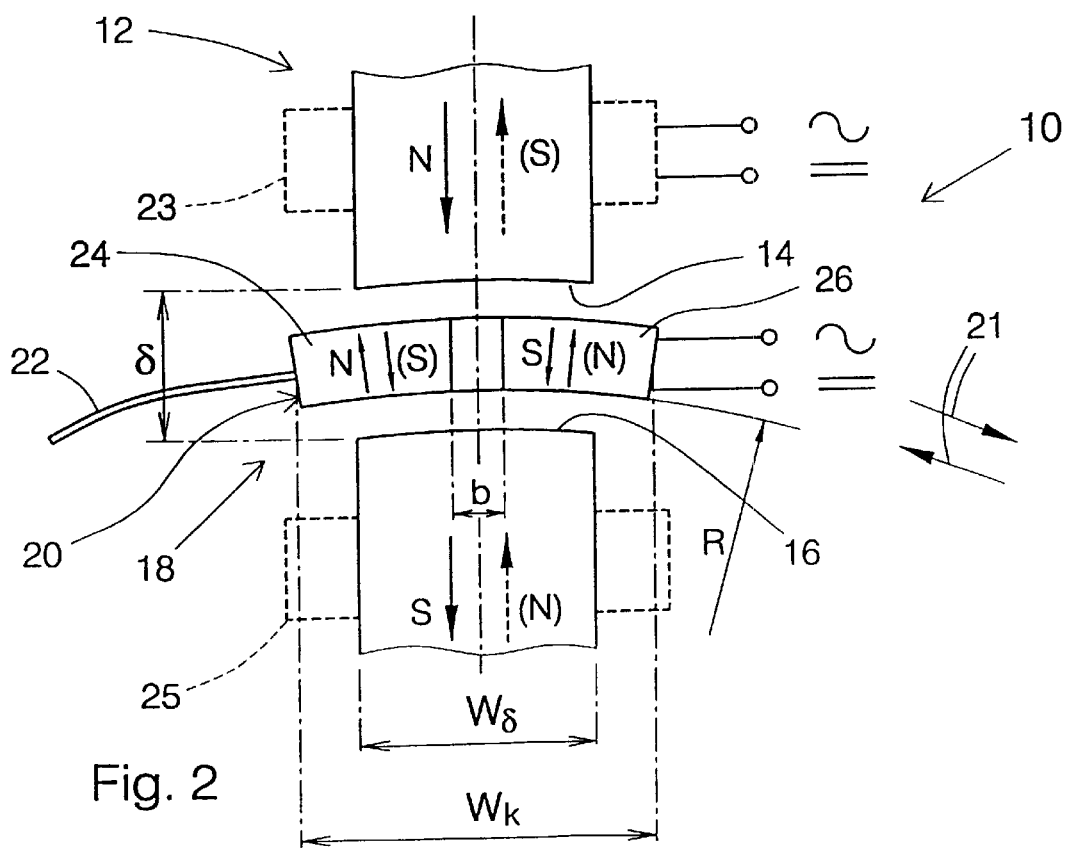
FIG. 2 is a schematic illustration of an electric machine, constructed and operative according to the present invention, having a nonlinear line of relative motion between a first magnet system and a second magnet system.

Referring now to the drawings, FIGS. 1 and 2 show a generalized representation of an electric machine, designated 10, constructed and operative according to the teachings of the present invention.

Electric machine 10 includes a first magnet system 12 having opposing surfaces 14 and 16 defining therebetween a gap 18. First magnet system 12 is configured so as to produce a magnetic field, referred to as the "gap field", directed across gap 18 primarily perpendicular to first surface 14.

Within gap 18 is positioned a second magnet system 20. Second magnet system 20 is mounted within gap 18 by any suitable mechanism (represented schematically by a drive rod 22) so as to be displaceable relative to first magnet system 12 along a line of travel within gap 18, typically substantially parallel to first surface 14. Second magnet system 20 includes a first magnetic element 24 and a second magnetic element 26. Magnetic elements 24 and 26 are similar and are both configured to generate a magnetic field primarily perpendicular to first surface 14, but in opposite directions. Magnetic elements 24 and 26 are preferably spaced from each other along the line of travel by a distance b as will be described below.

The electric machines of the present invention may be either motors or generators. In either case, one of first and second magnet systems 12 and 20 is either a permanent magnet system (represented by N(S) or S(N)) or an electromagnet system supplied by a source of direct current (represented schematically by a "=" symbol). In the case of a motor, the other magnet system is an electromagnet system supplied by a source of alternating current (represented schematically by a "~" symbol). This results in a reciprocating motion of second magnet system 20 relative to first magnet system 12, as indicated by arrows 21. In the case of a generator, the other magnet system is a coil arrangement with appropriate electrical connections.

In this context, it should be noted that the power supplies used in the present invention and the corresponding magnetic fields need not correspond to constant DC or sinusoidal AC. It is sufficient that one magnet system produces a non-alternating, non-zero magnetic field and that the other produces an operating magnetic field. The phrase "operating magnetic field" is used herein in the description and claims to refer to any magnetic field which varies substantially cyclically between a maximum value in one direction and either a maximum value in the reverse direction or zero. Thus, the operating current which generates the operating magnetic field may be any conventional AC supply, a pulsed supply or any other reversing or intermittent cyclic form. For convenience of reference, the following description will refer to the preferred non-limiting example in which standard sinusoidal AC and, where applicable, constant DC are used.

It should also be noted that the phrases "magnet system" and "magnetic elements" are used herein to refer to systems and elements which either actually produce a magnetic field or would, if connected to an electrical power source, produce a magnetic field. Thus, these terms may relate to permanent magnets, electromagnets provided with either AC or DC, e.g., via coils 23 and 25, and to corresponding coil arrangements used in a generator. Similarly, the structure of coils in a generator will be described as configured to generate a certain magnetic field, meaning that the coil structure used is such that, if a current was supplied to the coil structure, the stated field would be produced. Furthermore, it should be noted that the coils of a generator can also be correctly described as generating a magnetic field whenever a current is drawn from the generator.

Although most implementations of electric machine 10 employ a fixed first magnet system 12 and moving second magnet system 20, it should be noted that the invention is not limited to this configuration. Thus, in alternative implementations, second magnet system 20 is fixed and first magnet system 12 moves. For convenience of reference, both of these possibilities are referred to generically as "motion of second magnet system 20 relative to first magnet system 12".

It is a particular feature of certain preferred embodiments of the present invention that the second magnet system 20 is the alternating electromagnet system.

With reference specifically to FIG. 2, it is a further particular feature of certain preferred embodiments of the present invention that the line of travel of second magnet system 20 relative to first magnet system 12 is non-linear, typically in the form of an arc of radius R. In this case, surfaces 14 and 16, and hence gap 18, are preferably designed to run parallel to the line of travel. Second magnet system 20 is also preferably designed with a corresponding curvature to match that shape of the gap.

At this stage, it will be useful to define certain terminology to be employed below in the description and claims to refer to various parameters and dimensions of the electric machines of the present invention. Firstly, the total height of gap 18 measured perpendicular to the line of travel is denoted $\delta$, while the minimum clearance gap between first and second surfaces 14 and 16 and second magnet system 20 is denoted $\Delta$. The width of first and second surfaces 14 and 16 measured parallel to the line of travel is denoted $w_\delta$. An internal spacing between magnetic elements 24 and 26 of second magnet system 20 as measured along the line of travel is denoted b. The width of second magnet system 20, made up of the combined width of the two magnetic elements and spacing b, measured parallel to the line of travel is denoted $w_k$. Finally, the maximum intended displacement or motion amplitude of second magnet system 20 relative to first magnet system 12 in either direction from its equilibrium position as measured along the line of travel is denoted A.

Particular care must be taken in defining these terms in the case of a non-linear line of travel (FIG. 2). In this case, measurements are preferably made along, or parallel to, the line of travel or along a local perpendicular thereto. Alternatively, widths $w_\delta$ and $w_k$, amplitude A and spacing b can be expressed in angular units.

Figure 3:
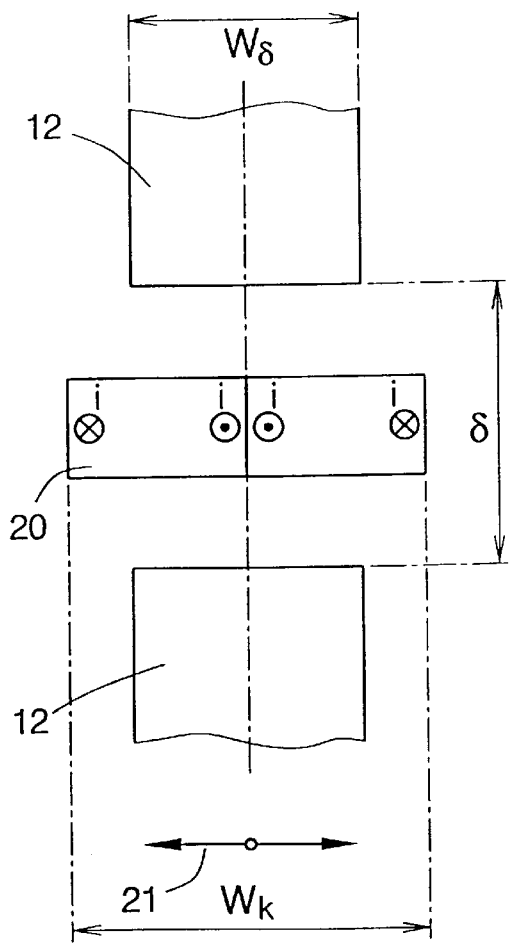
FIG. 3 is a schematic illustration of an implementation of the electric machine of FIG. 1 in a central position.
Figure 4:
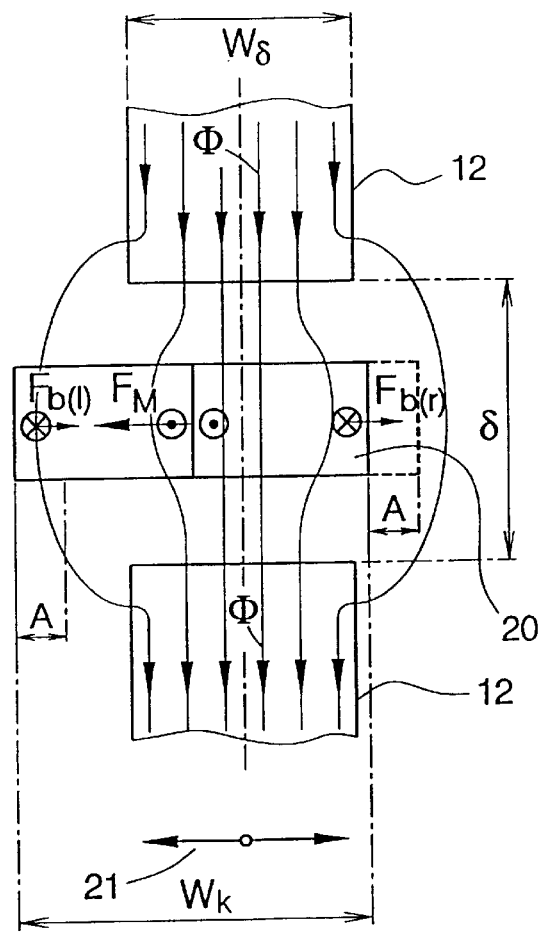
FIG. 4 is a schematic illustration of the implementation of FIG. 3 in a displaced position.

Turning now to the features of electric machine 10 in more detail, the principles of operation will be best understood with reference to FIGS. 3 and 4.

For convenience of reference, we consider second magnet system 20 to be a moving element excited by a direct current and first magnet system 12 to be fixed and supplied by an alternating current. FIG. 3 shows a first position of the machine in which the instantaneous current in first magnet system 12 is zero. Under these conditions, second magnet system 20 is self-adjusted to occupy a central position where symmetry axes of second magnet system 20 and of first magnet system 12 coincide. This means that the middle of spacer b (or the butt-joint point of pole pieces if b=0) is centrally positioned relative to the width of surfaces 14 and 16 of first magnet system 12.

This self-centering results from the non-alternating magnetic field of second magnet system 20 tending to a lowest energy symmetrical configuration relative to the magnetic circuit of first magnet system 12. For this reason, the machine described here does not require use of springs to return the movable part to its initial position.

FIG. 4 shows the machine in a second position in which the instantaneous current in first magnet system 12 and its corresponding magnet flux $\Phi$ are maximum. Under currents and magnet fluxes as shown, the movable magnet system 20 is maximally displaced to the left by amplitude A (the maximum displacement of the reciprocating movement). As the current decreases and reverses polarity to its maximum reverse voltage, second magnet system 20 reaches its maximum displacement to the right as shown. Thus, the oscillating will occur at the frequency of the voltage supplied to first magnet system 12.

It should be appreciated that the operation described here is independent of which of magnet systems 12 and 20 generates the alternating or nonalternating field and which of them is fixed or movable. The only necessary conditions are as follows:

one of the systems generates a non-alternating field while the other one generates an alternating or pulsed field; and system 20 is mounted within the gap of system 12 so as to allow relative motion up to maximum displacement or amplitude A.

It follows from the above that design of both magnet systems can be of any shape (plane, round, polygon, etc.). At the same time it should be noted that:

one of the magnet systems is to move free in the other one with maximum desirable amplitude A;

it is expedient to design the structure such that magnetic fluxes pass through a minimum total air gap.

The present invention provides a number of preferred relations between the dimensions of parts of the machine so as to optimize the design and construction for a given application. Some of these relations depend upon an intended maximum amplitude of movement A for which electric machine 10 is to be used. In the case of a motor application, the amplitude is limited to this value in use by providing an electrical supply configured to generate a maximum voltage corresponding to this value. In the case of a generator, the mechanical linkage for driving the moving part of the machine is preferably designed to define the maximum intended amplitude.

Once the intended maximum amplitude A has been determined, the dimensions of the components of electric machine 10 are preferably designed such that:

The common width $w_\delta$ of surfaces 14 and 16 of first magnet system 12 plus spacing b is chosen to be not less than double the maximum intended amplitude 2A of the reciprocating movement, i.e., $w_\delta + b \geq 2A$.

The width $w_k$ of second magnet system 20 is chosen to be not less than a sum of width $w_\delta$ and double the intended maximum amplitude 2A of the reciprocating movement, i.e., $w_k \geq w_\delta + 2A$.

In the case of an open-sided air gap structure, the length of second magnet system 20 is preferably chosen to be greater than a common length of the surfaces 14 and 16 of first magnet system 12 by at least half the size of the gap, i.e., $L_\delta \geq (L_k + \delta/2)$.

In order to present a treatment of the design considerations for electric machines according to the present invention, reference will be made to various forces illustrated in FIG. 4. Specifically, the reference designation $F_M$ represents a maximum force produced by a movable magnet system 20 at a time when the current in the winding of system 12 is maximum; reference $F_{b(r)}$ represents a force caused by the boundary effect produced by system 20 from its right edge at that time; and reference $F_{b(l)}$ designates a force caused by the boundary effect applied to system 20 from its left edge at that time.

From FIG. 3, it is evident that the currents at the ends of system 20 flow in directions opposite to those that generate the main tracking force $F_M$. As a result of interaction between the main flux with these end currents, boundary forces $F_{b(r)}$ and $F_{b(l)}$ act to oppose main tracking force $F_M$. The less the sum of $F_{b(r)}$ and $F_{b(l)}$ the higher the efficiency of the electric machine.

It will be clear that, in the limit as $w_k \to \infty$ $$\Sigma(F_{b(r)} + F_{b(l)}) \to 0$$

It is to be noted that efficiency of the electric machine rapidly decreases as soon as the borders of two poles of second magnet system 20 reach the ends of surfaces 14 and 16 (magnetic circuit or permanent magnet). In other words, it is not expedient to design the amplitude of reciprocating movement to be more than $(w_\delta + b)/2$. This means that the maximum value of amplitude A of reciprocating movement is preferably related to width $w_\delta$ of first magnet system according to:

$$w_\delta + b \geq 2A \qquad (1)$$

that is, a sum of width of magnet system 12; and a clearance b is to be not less than double the maximum electric machine.

Thus the degree of influence of the boundary effect is directly correlated with values of amplitude A, spacing b, width $w_k$ and width $w_\delta$. It is recommended that width is chosen to satisfy the relation:

$$w_k \geq w_\delta + 2A \qquad (2)$$

that is, width $w_k$ of the pole couple of second magnet system 20 (including clearance or spacing b) is to be not less than the sum of the width of system 12 and double the maximum amplitude of reciprocating movement of electric machine.

It is evident from FIG. 3 that the more each pole of system 20 extends beyond the ends of system 12, the smaller will be the boundary forces $F_{b(r)}$ and $F_{b(l)}$ and the corresponding influence of the boundary effect on performance (efficiency, outer dimensions, weight, etc.) of the electrical reciprocating machine. On another hand, over-extension of the width $w_k$ of the poles of system 20 results in increase in the weight, cost and dimensions of the electric machine. Design optimization regarding widths $w_\delta$ and $w_k$, i.e., the degree to which they exceed the aforementioned limitations, is to be performed by an engineer at the design stage depending upon each particular project's requirements.

The lengths of magnet systems, i.e., their dimensions perpendicular to both the line of travel and the height of the gap, for the open operating air gap design (FIGS. 6A and 6B below), are determined by minimum magnetic leakage criteria for the closed magnet system (preferably system 12). Preferably, the lengths satisfy the relation:

$$L_k \geq (L_\delta + \delta/2) \qquad (3)$$

The lengths of magnet systems 12 and 20 for closed operating air gap designs (FIGS. 6C and 6D below) are determined by the dimensions of the electric machine.

Figure 5A:
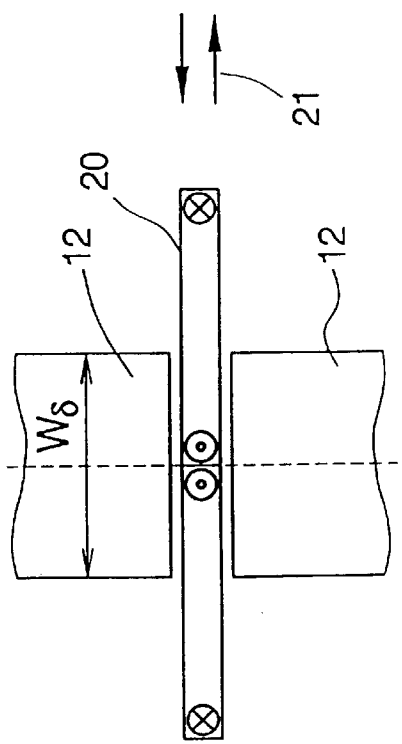
FIG. 5A is a schematic illustration of an implementation of the electric machine of FIG. 1 with zero spacing between magnetic elements of the second magnet system.
Figure 5C:
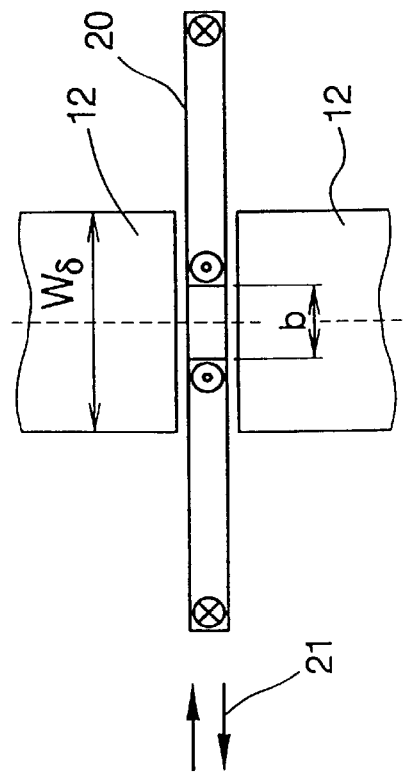
FIG. 5C is a schematic illustration of an implementation of the electric machine of FIG. 1 with non-zero spacing between magnetic elements of the second magnet system.
Figure 5B:
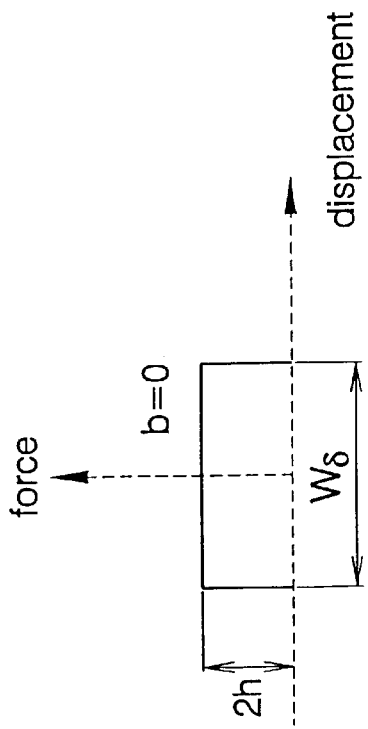
FIG. 5B is a graphic representation of actuating force as a function of displacement for the structure of FIG. 5A.

Turning now to FIGS. 5A–5D, the significance of spacing b will now be described. The value of spacing b may essentially be chosen anywhere in the range from zero up to the width of surfaces 14 and 16. FIG. 5A illustrates the structure of electric machine 10 with b=0, i.e., with second magnet system 20 formed as buttjointed adjacent poles. FIG. 5B shows the corresponding variation of force with displacement from the central position. As can be seen here, the force exerted by the machine is substantially constant at a value designated $2h$ over a range of movement equal to $w_\delta$. Outside this range of movement, the force drops abruptly to zero.

Figure 5D:
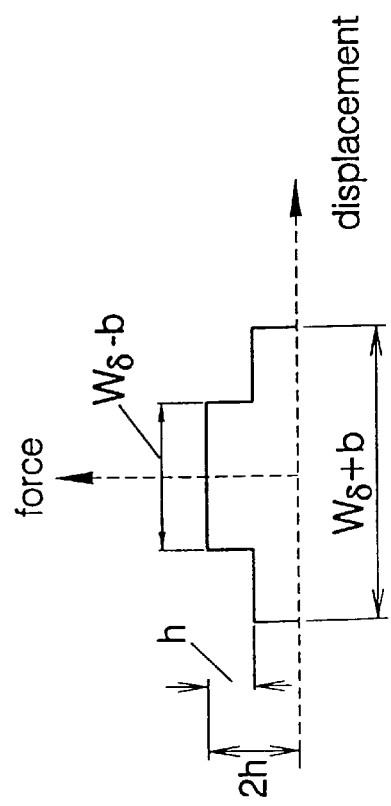
FIG. 5D is a graphic representation of actuating force as a function of displacement for the structure of FIG. 5C.

In contrast, FIGS. 5C and 5D show a parallel structure and force diagram for a construction with b>0. In this case, a stepped form is introduced into the force diagram such that the maximum value $2h$ is provided over a smaller range $w_\delta$–b and a lower value h is provided over additional side regions of width b. As a result, the total operative amplitude for a given width $w_\delta$ of surfaces 14 and 16 and for a given design of magnetic elements 24 and 26 is increased by width b. In addition, the form of the force diagram becomes a much closer approximation to a sinusoidal form. In generator applications, the output voltage assumes a corresponding form, thereby also approximating better to a sinusoidal form.

The use of a non-zero spacing b also ensures more efficient use of the flux of magnet system 20. When b=0, significant leakage of magnetic flux occurs due to closure between the pole pieces of system 20. By increasing spacing b to be at least about equal to, and preferably greater than, the air gap $\Delta$ between surfaces 14 and 16 of system 12, leakage of magnetic flux is substantially reduced.

Increased spacing b also serves to decrease the negative influence of the boundary effect for otherwise constant parameters by expanding the pole zone of system 20.

Clearance b between buttjointed pole pieces of system 20 can be filled by any material: magnetic or non-magnetic as well as by any combination of those, or the clearance may be maintained by a hollow frame. The use of soft magnetic material for the spacer may be advantageous in the case that system 20 is implemented with permanent magnets. Induced magnetization of the spacer provides magnetic attachment of each of the magnetic elements to the spacer, thereby helping to maintain firm internal mechanical unity of the components of system 20.

Turning now to the details of first magnet system 12, a number of different implementations will now described with reference to FIGS. 6 and 7. The magnetic circuit of system 12 is produced from laminated electric steel, soft ferrite, solid steel parts or the like. Its windings (or configuration of permanent magnets) are chosen depending on the design of the magnetic circuit of this system.

FIG. 6A shows a flat-surface pole structure for an open magnetic circuit implementation of system 12. FIG. 6B shows an equivalent structure formed as a closed magnetic circuit, thereby decreasing flux leakage and improving efficiency. The closed magnetic circuit of FIG. 6B includes a space 27 for coils or windings 23, 25 (see FIGS. 1 and 2). While the structure of FIG. 6B is clearly advantageous, less optimal designs with open magnetic circuits or no magnetic circuit at all may be used according to the conditions imposed by mechanical attachment requirements.

The operating air gap can be of any shape desired. One example shown in FIGS. 6C and 6D is a cylindrical or annular gap. Here too, the structure can be formed either as an open magnetic circuit (FIG. 6C) or, in preferred implementations, as a closed magnetic circuit (FIG. 6D) corresponding to a hollow annular box of soft magnetic material containing coils or windings 23, 25 (see FIG. 2) in an annular space 29.

FIGS. 7A–7G illustrate, by way of example, four possible constructions which can be used to implement the magnet system of FIG. 6D.

FIGS. 7A and 7B show an implementation in which the hollow annular box is constructed from a unitary U-section annular base element 28 and two annular cover portions 30 and 32. The parts are connected to each other by any known method (pasting, mechanical attachment, etc.). This implementation is most advantageously constructed from ferrite. FIGS. 7E and 7F show a similar implementation in which the U-section annular base element 29 is formed with one side wall extended upwards to form one side of a gap. In this case, only one annular cover portion 31 is required.

FIGS. 7C and 7D show an implementation in which the hollow annular box is constructed from two cylindrical portions 34 and 36, and three annular portions 38, 40 and 42 connected together by any known method (welding, brazing, pasting, etc.). All these parts can be made from any magnetic material. Particularly advantageous for this design is the use of reeled steel band or laminated steel sheets, laminated in the directions shown.

The cylindrical and the annular portions preferably have beveled edges for forming oblique-angled buttjoints, preferably at about 45°. Particularly in the case of components made from laminated sheet materials, this ensures that a minimum transient magnetic resistance is encountered.

A further possibility is that the hollow annular box may be constructed from a plurality of laminations, each corresponding to a radial segment of the hollow annular box. FIG. 7G illustrates a preferred shape of lamination 44 for such an implementation. The laminations may be of a one-piece or composite design.

It should be appreciated that first magnet system 12 may be shaped to form with a wide range of other shapes of the operative air gap including, but not limited to, arcuate and rounded forms, and polygonal gaps.

Turning now to the features of second magnet system 20 in more detail, these will be described with reference to FIGS. 8–18. System 20 includes two buttjointed spaced poles generating parallel but substantially opposite magnetic fields. This system is open in order to be placed in the air gap of the system 12. The mechanical configurations of the two magnet systems are to be formed to make possible mutual movement up to maximum displacement or amplitude A.

Figure 8A:
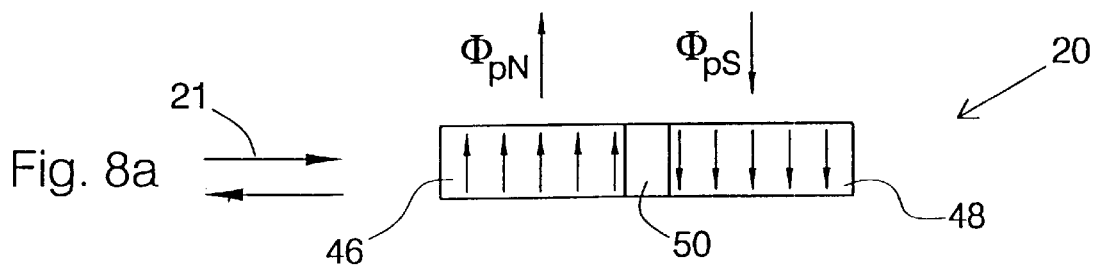
FIG. 8A is a schematic cross-sectional view through a first implementation of the second magnet system of FIG. 1 employing permanent magnet elements.
Figure 8B:
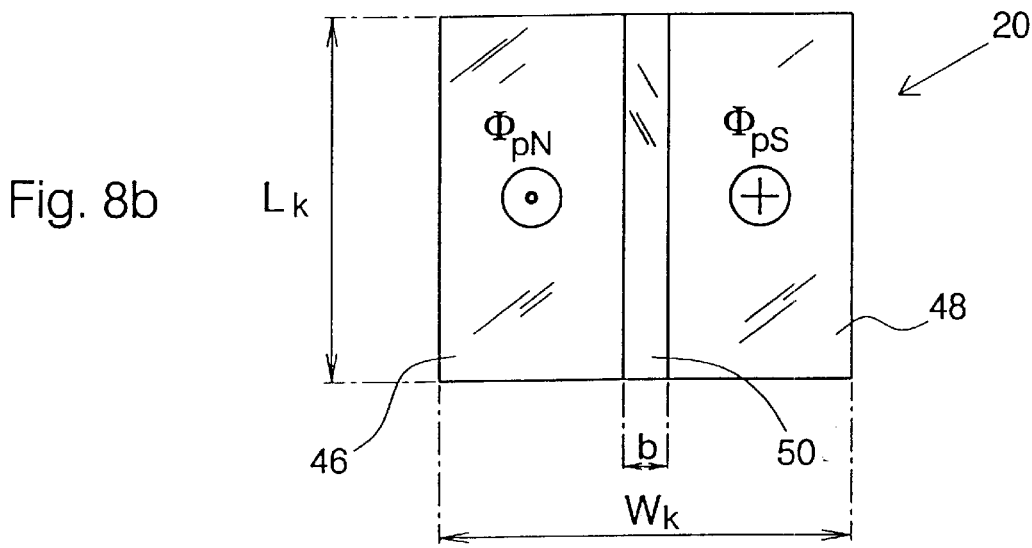
FIG. 8B is a top view of the implementation of FIG. 8A.

The shape of system 20 is chosen to match to the shape of system 12. FIGS. 8–11 illustrate a number of alternative structures for use with a magnet system 12 with flat pole surfaces (FIGS. 6A and 6B). FIGS. 8A and 8B show a basic implementation in which the two magnetic elements are two permanent magnets 46, 48 magnetized in opposite directions parallel to the height of gap 18. The two magnets are preferably spaced apart by a spacer 50 of width b, as described above.

Figure 9A:
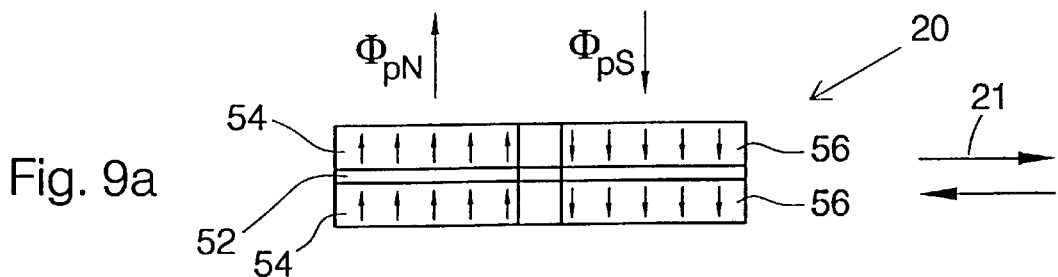
FIG. 9A is a schematic cross-sectional view through another implementation of the second magnet system of FIG. 1 employing permanent magnet elements.
Figure 9B:
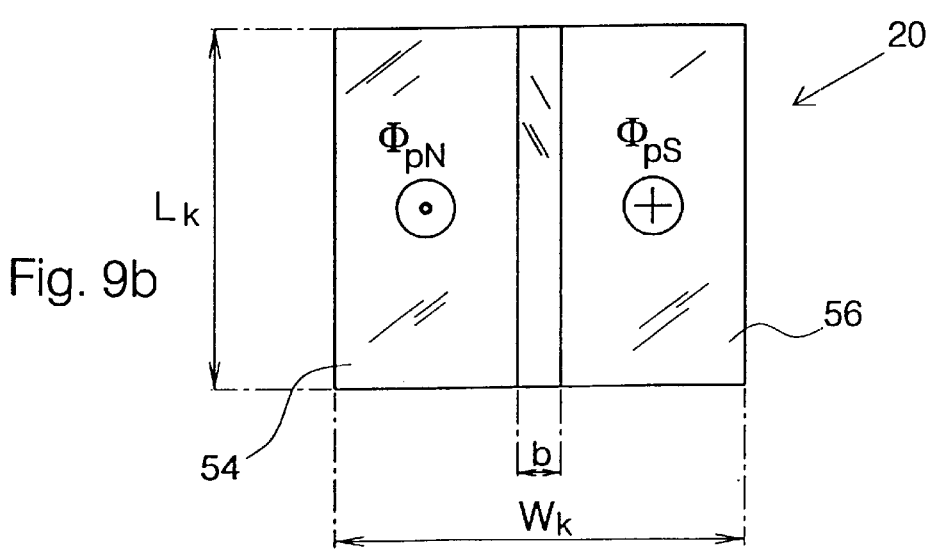
FIG. 9B is a top view of the implementation of FIG. 9A.

FIGS. 9A and 9B show a variation of this implementation employing a magnetically passive support structure 52 for supporting the first and second magnetic elements. Support structure 52 may be made from either magnetic or non-magnetic material, or a combination thereof. Preferably, soft magnetic material, such as iron, is used. The use of an additional support structure is particularly valuable for providing internal mechanical strength to second magnet system 20 and for facilitating mechanical connection to the system by conventional techniques such as welding.

Preferably, support structure 52 is implemented as a substantially continuous layer, as shown. The magnetic elements can then be formed by attaching magnets 54, 56 to at least one and preferably both surfaces of the layer. The magnets forming a common pole are magnetized in the same direction while the magnets forming the other pole are magnetized in the opposite direction. Spacer 50 may advantageously be integrally formed with support structure 52. The surface portion of spacer 50 may advantageously be implemented as a non-magnetic layer to further reduce internal closure of magnetic flux within system 20.

It should be noted that the support structure can be cast from an appropriate material either before or after preliminary assembly of poles relating to system 20. Optionally, the support structure can feature one or more holes serving to decrease magnetic flux leakage between poles of system 20, minimize electromagnetic losses, and reduce overheating of windings.

Figure 10A:
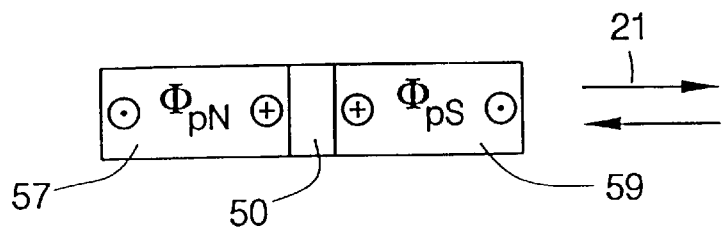
FIG. 10A is a schematic cross-sectional view indicating the principles of an implementation of the second magnet system of FIG. 1 employing coils.
Figure 10B:
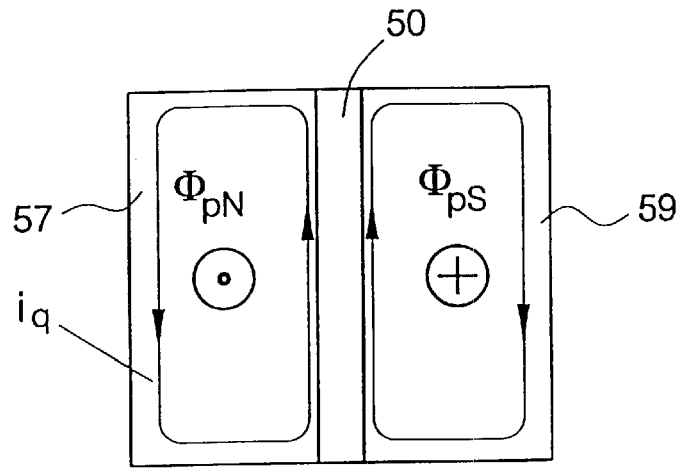
FIG. 10B is a top view corresponding to FIG. 10A.

FIGS. 10A and 10B show a schematic representation of an implementation in which the two magnetic elements are two coils 57, 59 wound/connected to produce magnetic fields in opposite directions primarily parallel to the height of gap 18. It will be clear that for analytical purposes, this arrangement may be considered fully analogous to the permanent magnet implementation of FIGS. 8A and 8B.

As mentioned earlier, the coils may be supplied with either the nonalternating or the operating current, according to the implementation of first system 12. Here too, the coils are preferably spaced apart by a spacer 50 of width b.

The windings of system 20 may be attached to a base, encapsulated, molded or the like, to form a rigid construction. Alternatively, they may be mounted through any insulation on a common part of the magnetic circuit of width $w_k$.

The windings can be located either on one side or both sides of a base. The base itself can be made from either from electrically and/or magnetically insulating materials or from electrically and/or magnetically conducting materials.

Figure 11A:
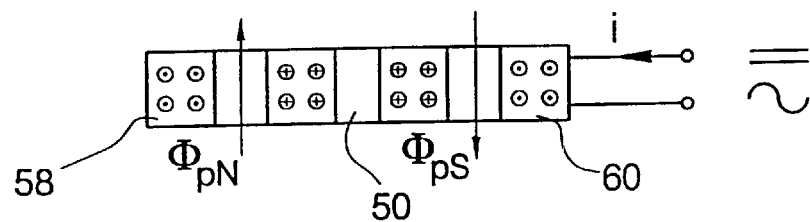
FIG. 11A is a schematic cross-sectional view through an implementation of the second magnet system of FIG. 1 employing coils.
Figure 11B:
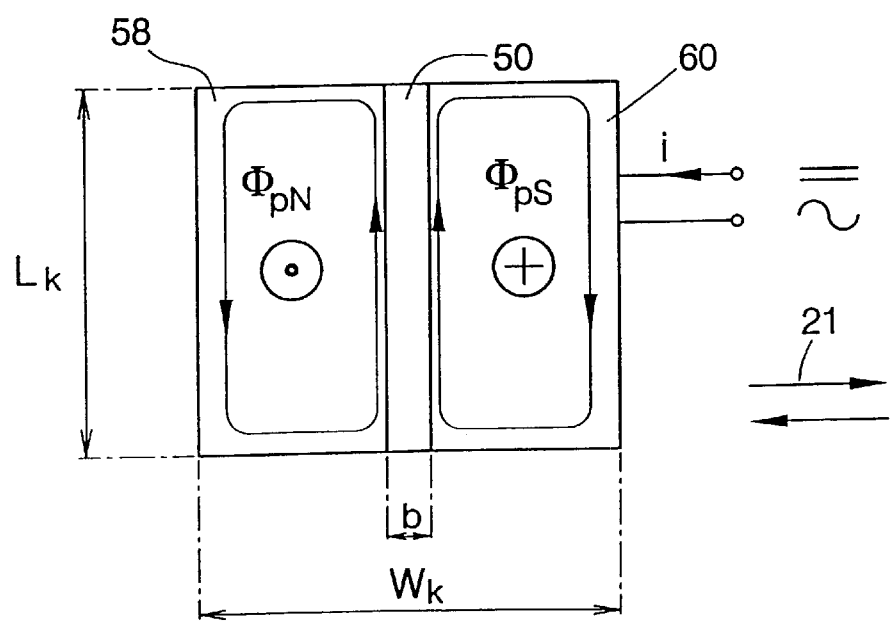
FIG. 11B is a top view of the implementation of FIG. 11A.
Figures 15A, 15B:
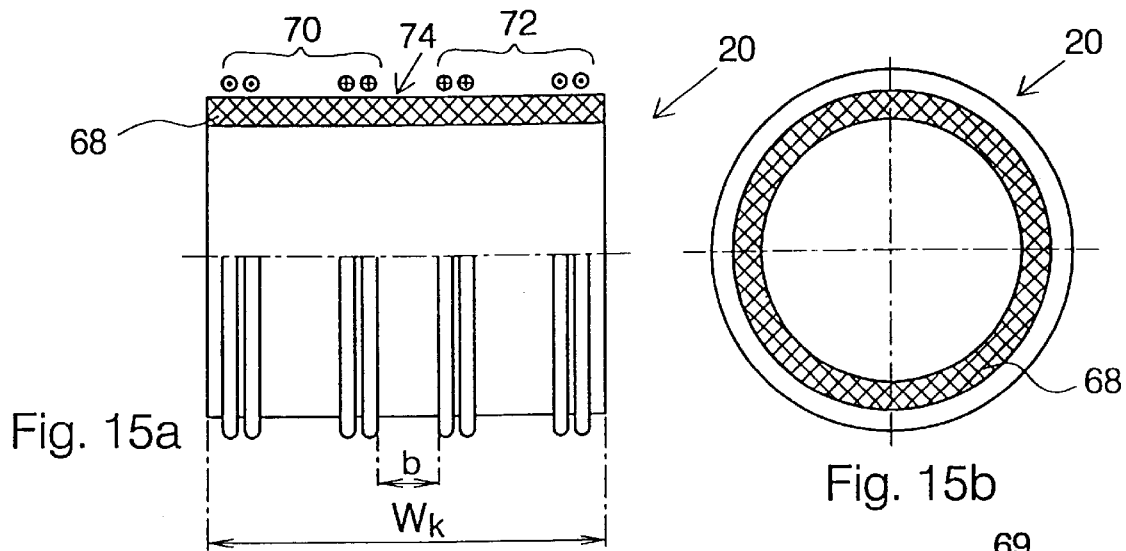
FIGS. 15A and 16A are schematic longitudinal cross-sectional views, respectively, of a cylindrical and a hexagonal-section implementation of the second magnet system of FIG. 1 employing coils.
FIGS. 15B and 16B are corresponding schematic transverse cross-sectional views of the implementations of FIGS. 15A and 16A, respectively.

FIGS. 11A and 11B show a practical coil implementation using hollow core coils 58 and 60. Optionally, coils 58 and 60 may be filled with magnetic pole pieces or other material.

Figures 16A, 16B:
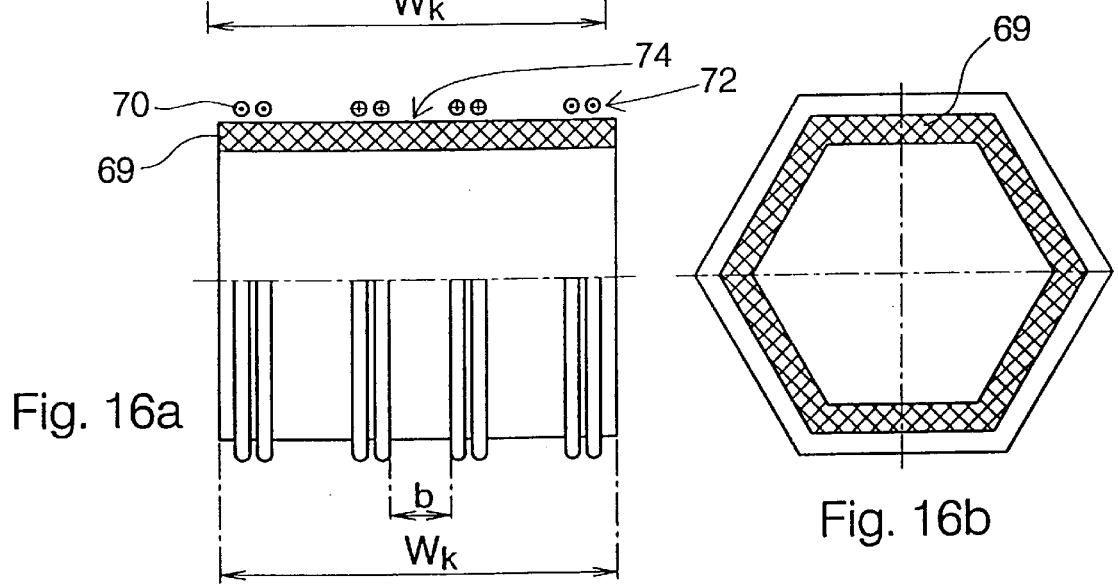
Figure 17A:
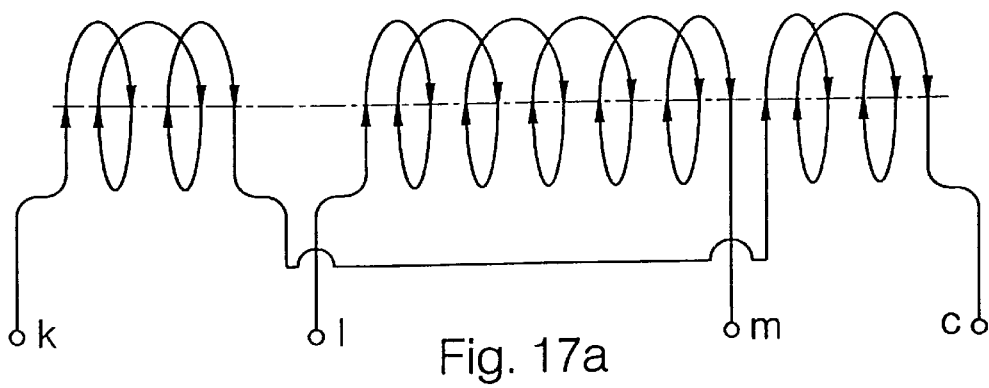
FIG. 17A is a schematic circuit diagram showing a possible configuration of electrical connections for the implementations of FIGS. 15A and 16A.
Figures 17B, 17C:
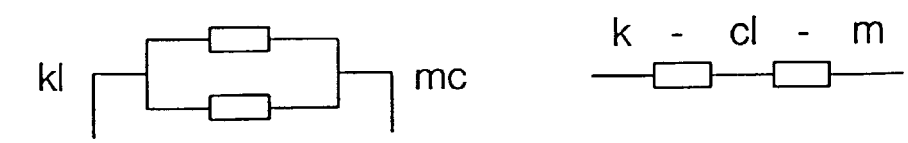
FIGS. 17B and 17C are diagrams showing how the connections of FIG. 17A may be connected in parallel or series, respectively.
Figure 18A:
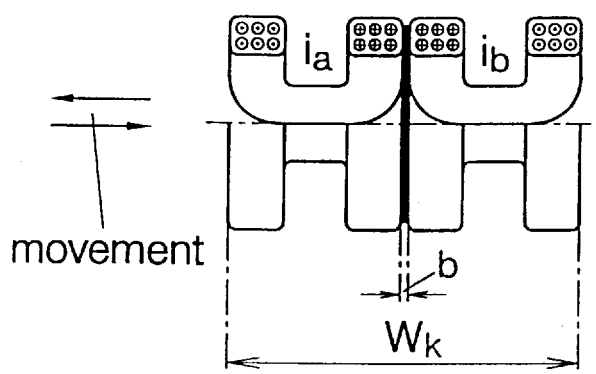
FIG. 18A is a schematic cut-away side view of a further cylindrical implementation of the second magnet system of FIG. 1 employing coils.
Figure 18B:
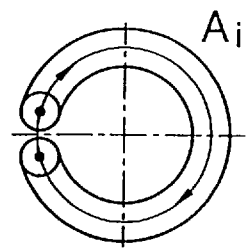
FIG. 18B is a schematic end view of the implementation of FIG. 18A.
Figure 18C:
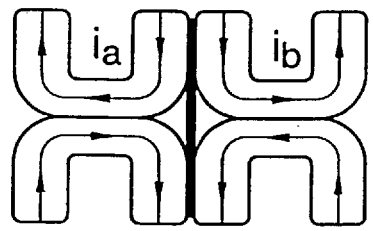
FIG. 18C is a schematic side view of the implementation of FIG. 18A.
Figure 18D:
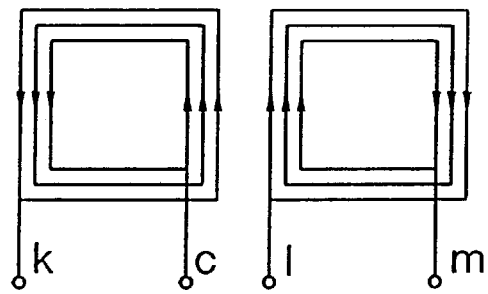
FIG. 18D is a schematic circuit diagram equivalent of the implementation of FIG. 18A.

FIGS. 12A–18D illustrate a number of implementations of magnet system 20 for use with a first magnet system 12 having an annular or, in the case of FIGS. 14 and 16, a polygonal gap (FIGS. 6C and 6D).

FIGS. 12A and 12B show a basic permanent magnet implementation employing two cylindrical, oppositely radially magnetized permanent magnets 62 and 64. FIGS. 13A and 13B show a similar implementation employing a cylindrical layer support structure 66 with internal and external cylindrical magnets. FIGS. 14A and 14B show a basic implementation of a hexagonal-section magnet system for use with a hexagonally shaped gap. In each of these cases, each of the permanent magnets forming a pole may be unitary or may be composed from several pieces of any shape. The above systems may advantageously be adapted to include a non-zero spacer between the magnetic elements.

FIGS. 15A–18D relate to coil implementations of system 20. It will be clear that a coil extended around the circumference of a cylinder 68 (or hexagonal base 69) is essentially equivalent to two sets of circumferential windings carrying current in opposite directions. Thus, two coils 70, 72 for producing opposing radial fields have adjacent windings carrying similarly directed currents either side of a spacer 74. FIG. 17A illustrates schematically a possible scheme for connecting the windings in which the adjacent windings of the two coils are connected continuously and the outer windings are connected together. FIGS. 17B and 17C illustrate possible parallel and serial connections, respectively, for such a scheme. In FIGS. 17A–17C, terminals or coil connections bear designations c, k, l, and m.

FIGS. 18A–18D illustrate an alternative implementation in which each coil is formed as an independent component. In this case, the magnetic effects of the short sections of each coil running parallel to the direction of motion cancel out.

Figure 19:
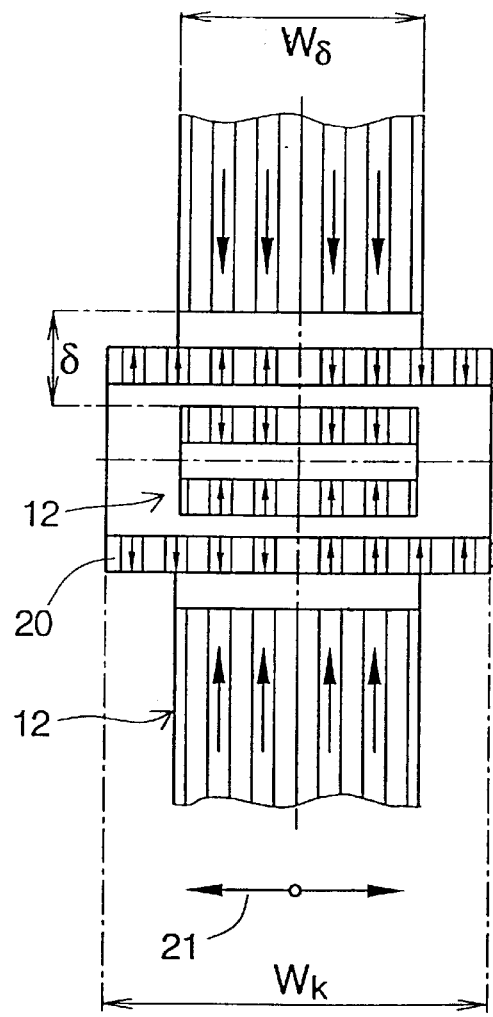
FIG. 19 is a schematic cross-sectional view through a cylindrically symmetric implementation of the electric machine of FIG. 1.
Figure 20:
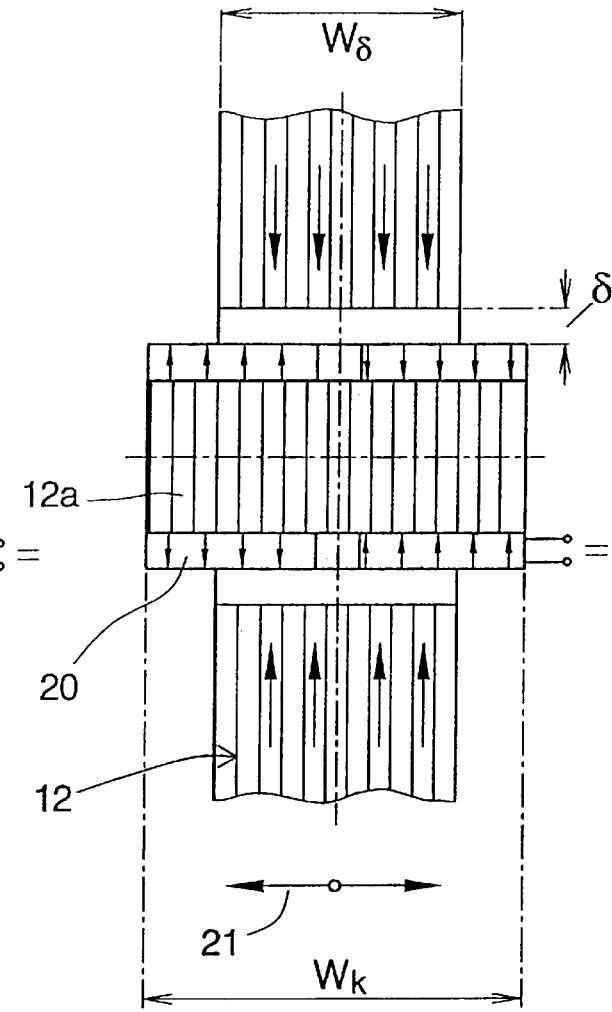
FIG. 20 is a schematic cross-sectional view of a variant embodiment of the electric machine of the present invention in which one pole piece of the first magnet system is made integral to the second magnet system.

FIGS. 19 and 20 illustrate the constructions of magnetic circuits for two implementations of the electric machine of the present invention having cylindrical symmetry. FIG. 19 corresponds to a first magnet system structure of FIGS. 6C or 6D together with a second magnet system as in one of FIGS. 12, 13, 15 and 18. In this case, first magnet system 12 preferably has a constant width $w_k$ along the entire gap perimeter.

FIG. 20 shows a variant embodiment in which part of the magnetic circuit of first magnet system 12a is formed of a movable part of width approximately $w_k$ formed as a core of cylindrical second magnet system 20.

It will be appreciated that the above descriptions are intended only to serve as examples, and that many other embodiments are possible within the spirit and the scope of the present invention.

What is claimed is:

1. A synchronous reciprocating electric machine comprising:
    (a) a first magnet system having a first surface and a second surface opposing said first surface so as to define therebetween a gap, said first magnet system being configured for generating a substantially uniform magnetic field in said gap extending substantially solely perpendicular to said first surface;
    (b) a second magnet system mounted within said gap so as to be displaceable relative to said first magnet system along a line of travel through said gap, said second magnet system including a first magnetic element configured to generate a magnetic field oriented primarily perpendicular to said first surface and extending in said gap in a first direction only, said second magnet system further including a second magnetic element similar to, and mounted in fixed relation to, said first magnetic element, said second magnetic element being configured to generate a magnetic field oriented primarily perpendicular to said first surface and extending in said gap in a second direction only, said second direction being opposite to said first direction,
    wherein one of said first and second magnet systems produces a non-alternating magnetic field and the other of said first and second magnet systems is a coil assembly for producing an operating magnetic field; and
    (c) electrical connections connected to said coil assembly for supplying an electrical current to said coil assembly to produce a reciprocation of said second magnet system relative to said first magnet system.

2. The electric machine of claim 1, wherein said second magnetic element is spaced from said first magnetic element along said line of travel by a distance b, where b>0.

3. The electric machine of claim 2, wherein said second magnet system includes a spacer of thickness b deployed between said first and second magnetic elements, said spacer including soft magnetic material.

4. The electric machine of claim 2, wherein said second magnet system includes a spacer of thickness b deployed between said first and second magnetic elements, said spacer including non-magnetic material.

5. The electric machine of claim 2, wherein said second magnet system is distanced from said first surface by a clearance gap of width Δ, said second magnet system being configured such that distance b has a magnitude greater than width Δ.

6. The electric machine of claim 2, further comprising means for defining a given maximum amplitude A of reciprocal motion of said second magnet system relative to said first magnet system, wherein said first and second surfaces have a dimension $w_\delta$ as measured parallel to said line of travel and said second magnet system has a dimension $w_k$ as measured parallel to said line of travel, said first and second magnet systems being designed such that $w_\delta + b \geq 2A$ and $w_k \geq w_\delta + 2A$.

7. The electric machine of claim 1, wherein said second magnet system is mounted relative to said first magnet system by a mechanical coupling, said mechanical coupling being configured to define a non-linear line of travel.

8. The electric machine of claim 1, wherein said first magnet system is formed as a substantially closed magnetic circuit.

9. The electric machine of claim 1, wherein said second magnet system is implemented as said coil assembly.

10. The electric machine of claim 1, wherein said first and second surfaces are shaped such that in a plane perpendicular to said line of travel said gap has a closed annular form, said second magnet system being implemented as a corresponding hollow cylindrical magnet system.

11. The electric machine of claim 10, wherein said first magnet system is implemented as a hollow annular box of soft magnetic material containing windings.

12. The electric machine of claim 11, wherein said hollow annular box is constructed from at least two cylindrical portions and an least three annular portions, said cylindrical and said annular portions having beveled edges for forming oblique-angled butt-joints.

13. The electric machine of claim 11, wherein said hollow annular box is constructed from a unitary U-section annular base element and at least one annular cover portion.

14. The electric machine of claim 11, wherein said hollow annular box is constructed from a plurality of laminations each corresponding to a radial segment of said hollow annular box.

15. The electric machine of claim 10, wherein said second magnet system is implemented as said coil assembly having windings arranged primarily circumferencially in said cylindrical magnet system.

16. The electric machine of claim 1, wherein said second magnet system includes a magnetically passive support structure for supporting said first and second magnetic elements.

17. The electric machine of claim 16, wherein said support structure is made from soft magnetic material.

18. The electric machine of claim 15, wherein said support structure is implemented as a substantially continuous layer, said first and second magnetic elements being attached to at least one surface of said layer.

19. The electric machine of claim 1, wherein said first surface and said second surface are stationary, said first magnetic element and said second magnetic element moving relative to said first surface and said second surface.

20. A synchronous reciprocating electric machine comprising:
(a) a first magnet system having a first surface and a second surface opposing said first surface so as to define therebetween a gap, said first magnet system being configured for generating a magnetic field in said gap extending substantially solely perpendicular to said first surface;
(b) a second magnet system mounted within said gap, said second magnet system including a first magnetic element configured to generate a magnetic field primarily perpendicular to said first surface in a first direction and a second magnetic element similar to, and mounted in fixed relation to, said first magnetic element, said second magnetic element being configured to generate a magnetic field primarily perpendicular to said first surface in a direction opposite to said first direction, said second magnet system being mounted within said gap so as to be displaceable relative to said first magnet system along a line of travel through said gap between a first extreme position wherein said first magnetic element is disposed mostly outside of said gap while said second magnetic element is disposed mostly within said gap and a second extreme position wherein said second magnetic element is disposed mostly outside of said gap while said first magnetic element is disposed mostly within said gap, wherein one of said first and second magnet systems produces a non-alternating magnetic field and the other of said first and second magnet systems is a coil assembly for producing an operating magnetic field; and
(c) electrical connections connected to said coil assembly for supplying an electrical current to said coil assembly to produce a reciprocation of said second magnet system relative to said first magnet system along said line of travel between said first extreme position and said second extreme position.

21. A synchronous reciprocating electric machine comprising:
(a) a first magnet system having a first surface and a second surface opposing said first surface so as to define therebetween a gap, said first magnet system being configured for generating a magnetic field in said gap extending substantially solely perpendicular to said first surface;
(b) a second magnet system mounted within said gap so as to be displaceable relative to said first magnet system along a line of travel through said gap, said second magnet system including a first magnetic element configured to generate a magnetic field oriented primarily perpendicular to said first surface and extending in said gap in a first direction only, said second magnet system further including a second magnetic element similar to, and mounted in fixed relation to, said first magnetic element, said second magnetic element being configured to generate a magnetic field oriented primarily perpendicular to said first surface and extending in said gap in a second direction only, said second direction being opposite to said first direction, wherein one of said first and second magnet systems produces a non-alternating magnetic field and the other of said first and second magnet systems includes a coil for producing an operating magnetic field, said coil being wound in a plane extending parallel to said line of travel,
(c) electrical connections connected to said coil assembly for supplying an electrical current to said coil assembly to produce a reciprocation of said second magnet system relative to said first magnet system.

22. A synchronous reciprocating electric machine comprising:
(a) a first magnet system having a first surface and a second surface opposing said first surface so as to define therebetween a gap, said first magnet system being configured for generating a magnetic field in said gap extending substantially solely perpendicular to said first surface;
(b) a second magnet system mounted within said gap so as to be displaceable relative to said first magnet system along a line of travel through said gap, said second magnet system including a first magnetic element configured to generate a magnetic field oriented primarily perpendicular to said first surface and extending in said gap in a first direction only, said second magnet system further including a second magnetic element similar to, and mounted in fixed relation to, said first magnetic element, said second magnetic element being configured to generate a magnetic field oriented primarily perpendicular to said first surface and extending in said gap in a second direction only, said second direction being opposite to said first direction, wherein one of said first and second magnet systems produces a non-alternating magnetic field and the other of said first and second magnet systems is a coil assembly for producing an operating magnetic field, said gap being free of any magnetic core windings of said first magnet system, thereby minimizing a width of said gap; and (c) electrical connections connected to said coil assembly for supplying an electrical current to said coil assembly to produce a reciprocation of said second magnet system relative to said first magnet system.

23. A synchronous reciprocating electric machine comprising:

(a) a first magnet system having a first surface and a second surface opposing said first surface so as to define therebetween a gap, said first magnet system being configured for generating a magnetic field in said gap extending substantially solely perpendicular to said first surface;

(b) a second magnet system mounted within said gap so as to be displaceable relative to said first magnet system along a line of travel through said gap, said second magnet system including a first magnetic element configured to generate a magnetic field oriented primarily perpendicular to said first surface and extending in said gap in a first direction only, said second magnet system further including a second magnetic element similar to, and mounted in fixed relation to, said first magnetic element, said second magnetic element being configured to generate a magnetic field oriented primarily perpendicular to said first surface and extending in said gap in a second direction only, said second direction being opposite to said first direction, wherein one of said first and second magnet systems produces a non-alternating magnetic field and the other of said first and second magnet systems is a coil assembly for producing an operating magnetic field; and (c) electrical connections connected to said coil assembly for supplying an electrical current to said coil assembly to produce a reciprocation of said second magnet system relative to said first magnet system, wherein said first and said second magnet systems are configured to provide said second magnet system with a magnetically induced equilibrium position substantially centrally located with respect to said gap when said coil assembly is de-energized.

24. A method for building a synchronous reciprocating electric machine, comprising:

providing a first magnet system having a first surface and a second surface opposing said first surface so as to define therebetween a gap, said first magnet system being configured for generating a magnetic field in said gap extending substantially solely perpendicular to said first surface;

disposing a second magnet system within the gap so as to be displaceable relative to the first magnet system along a line of travel through the gap, the second magnet system including a first magnetic element configured to generate a magnetic field oriented primarily perpendicular to the first surface and extending in said gap in a first direction only, the second magnet system further including a second magnetic element similar to, and mounted in fixed relation to, the first magnetic element, the second magnetic element being configured to generate a magnetic field oriented primarily perpendicular to the first surface and extending in said gap in a second direction only, said second direction being opposite to the first direction, the second magnetic element being spaced from the first magnetic element along the line of travel by a distance b, wherein one of the first and second magnet systems produces a non-alternating magnetic field and the other of the first and second magnet systems is a coil assembly for producing an operating magnetic field;

determining a maximum intended amplitude A of relative reciprocal movement of said second magnet system relative to said first magnet system;

providing the first and second surfaces of the first magnet system with a dimension $w_\delta$ as measured parallel to the line of travel of the second magnet system such that $w_\delta + b \geq 2A$;

providing the second magnet system with a dimension $w_k$ as measured parallel to the line of travel of the second magnet system such that $w_k \geq w_\delta + 2A$; and coupling electrical connections to the coil assembly for supplying an electrical current to said coil assembly to produce a reciprocation of the second magnet system relative to the first magnet system.

25. The method of claim 24, wherein where b>0.

26. The method of claim 24, wherein where distance b is chosen to be at least about the spacing between said second magnet system and said first surface.

27. The method of clam 26, wherein the second magnet system is constructed with a magnetically-passive intermediate spacer of width b.

28. A synchronous reciprocating electric machine comprising:

(a) a first magnet system having a first surface and a second surface opposing said first surface so as to define therebetween a gap, said first magnet system being configured for generating a substantially uniform magnetic field in said gap extending substantially solely perpendicular to said first surface;

(b) a second magnet system mounted within said gap so as to be displaceable relative to said first magnet system along a line of travel through said gap, said second magnet system including a first magnetic element configured to generate a first respective magnetic field primarily perpendicular in said gap to said first surface in a first direction and a second magnetic element similar to, and mounted in fixed relation to, said first magnetic element, said second magnetic element being configured to generate a second respective magnetic field primarily perpendicular in said gap to said first surface in a direction opposite to said first direction, said first respective magnetic field and said second respective magnetic field having respective axes of symmetry which are substantially spaced from one another along said line of travel, said second magnet system having exactly two magnetic fields, wherein one of said first and second magnet systems produces a non-alternating magnetic field and the other of said first and second magnet systems is a coil assembly for producing an operating magnetic field; and (c) electrical connections connected to said coil assembly for supplying an electrical current to said coil assembly to produce a reciprocation of said second magnet system relative to said first magnet system.

29. The electric machine of claim 28, wherein said second magnet system includes a spacer of thickness b deployed between said first and second magnetic elements, where b>0.

30. The electric machine of claim 29, wherein said second magnet system is distanced from said first surface by a clearance gap of width Δ, said second magnet system being configured such that thickness b has a magnitude at least about width Δ.

31. The electric machine of claim 28, wherein said first and second surfaces are shaped such that in a plane perpendicular to said line of travel said gap has a closed annular form, said second magnet system being implemented as a corresponding hollow cylindrical magnet system.

32. The electric machine of claim 31, wherein said first magnet system is implemented as a hollow annular box of soft magnetic material containing windings.

33. The electric machine of claim 28, wherein said first surface and said second surface are stationary, said first magnetic element and said second magnetic element moving relative to said first surface and said second surface.

34. A synchronous reciprocating electric machine comprising:

(a) a first magnet system having a first surface and a second surface opposing said first surface so as to define therebetween a gap, said first magnet system being configured for generating a substantially uniform magnetic field in said gap extending substantially solely perpendicular to said first surface;

(b) a second magnet system mounted within said gap so as to be displaceable relative to said first magnet system along a line of travel through said gap, said second magnet system including a first magnetic element configured to generate a first respective magnetic field primarily perpendicular in said gap to said first surface in a first direction and a second magnetic element similar to, and mounted in fixed relation to, said first magnetic element, said second magnetic element being configured to generate a second respective magnetic field primarily perpendicular in said gap to said first surface in a direction opposite to said first direction, said first respective magnetic field and said second respective magnetic field occupying adjacent regions of space essentially without overlap, said second magnet system having exactly two magnetic fields, wherein one of said first and second magnet systems produces a non-alternating magnetic field and the other of said first and second magnet systems is a coil assembly for producing an operating magnetic field; and (c) electrical connections connected to said coil assembly for supplying an electrical current to said coil assembly to produce a reciprocation of said second magnet system relative to said first magnet system.

35. The electric machine of claim 34, wherein said second magnet system includes a spacer of thickness b deployed between said first and second magnetic elements, where b>0.

36. The electric machine of claim 35, wherein said second magnet system is distanced from said first surface by a clearance gap of width Δ, said second magnet system being configured such that thickness b has a magnitude at least about width Δ.

37. The electric machine of claim 34, wherein said first and second surfaces are shaped such that in a plane perpendicular to said line of travel said gap has a closed annular form, said second magnet system being implemented as a corresponding hollow cylindrical magnet system.

38. The electric machine of claim 37, wherein said first magnet system is implemented as a hollow annular box of soft magnetic material containing windings.

39. The electric machine of claim 34, wherein said first surface and said second surface are stationary, said first magnetic element and said second magnetic element moving relative to said first surface and said second surface.

* * * * *